United States Patent
Degertekin et al.

(10) Patent No.: US 6,643,025 B2
(45) Date of Patent: Nov. 4, 2003

(54) MICROINTERFEROMETER FOR DISTANCE MEASUREMENTS

(75) Inventors: Fahrettin L. Degertekin, Decatur, GA (US); Thomas R. Kurfess, Marietta, GA (US); Byungki Kim, Alpharetta, GA (US); Hosein Ali Razavi, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/109,754

(22) Filed: Mar. 29, 2002

(65) Prior Publication Data

US 2002/0163648 A1 Nov. 7, 2002

Related U.S. Application Data

(60) Provisional application No. 60/279,575, filed on Mar. 29, 2001.

(51) Int. Cl.[7] ................................................. G01B 9/02
(52) U.S. Cl. ........................ 356/505; 356/496; 356/498; 356/505; 356/511; 356/521; 356/499; 250/237 G
(58) Field of Search ................................. 356/496, 498, 356/505, 511, 521, 499; 250/237 G (56) References Cited

U.S. PATENT DOCUMENTS

| | | |
|---|---|---|
| 4,188,124 A | 2/1980 | Jaerisch et al. |
| 4,955,718 A | * 9/1990 | Michel ..................... 356/499 |
| 5,402,234 A | 3/1995 | Deck |
| 5,526,116 A | 6/1996 | de Groot |
| 5,565,987 A | 10/1996 | Jain et al. |
| 5,908,987 A | 6/1999 | Atalar et al. |
| 6,038,057 A | 3/2000 | Brazas, Jr. et al. |

OTHER PUBLICATIONS

Degertekin et al., "Optical Displacement Sensor," Publication No. US–2002–0039463–A1, published Apr. 4, 2002.
Zygo Corporation, "Zygo Corporation's NewView 5000; Precise, Rapid, Noncontact 3D Surface Profiling," Apr. 2001.
Cooper et al., "High–resolution micromachined interferometric accelerometer," Applied Physics Letters, vol. 27, No. 22, May, 29, 2000, pp. 3316–3318.
Manalis, et al., "Interdigital Cantilevers for atomic force microscopy," Applied Physics Letters, vol. 65, No. 25, Dec. 16, 1996, pp. 3944–3946.
Yaralioglu et al., "Analsis and design of an interdigital cantilever as a displacement sensor," Journal of Applied Physics, vol. 83, No. 12, Jun. 15, 1998, pp. 74057415.

(List continued on next page.)

Primary Examiner—Samuel A. Turner
(74) Attorney, Agent, or Firm—Thomas, Kayden, Horstemeyer & Risley, LLP (57) ABSTRACT

Several embodiments of a microinterferometer are disclosed. A first embodiment of a microinterferometer for measuring the absolute distance to an object surface includes a substrate. The microinterferometer also includes a phase-sensitive, reflective diffraction grating formed on the substrate. The diffraction grating is configured to reflect a first portion of an incident light and transmit a second portion of the incident light, such that the second portion of the incident light is diffracted. The microinterferometer further includes a lens formed on the substrate for focusing the second portion of the incident light to a predetermined local distance, and a photo-detector for receiving interference patterns produced from the first portion of the incident light reflected from the diffraction grating and the second portion of the incident light reflected from the object surface.

41 Claims, 6 Drawing Sheets

OTHER PUBLICATIONS

Chen et al., "Overview of three–dimensional shape measurement using optical methods," Opt. Eng. 39(1), Jan. 10–22, 2000.

DeWitt et al., "Range–finding method using diffraction gratings," Applied Optics, vol. 34, No. 14, May 10, 1995, pp. 2510–2521.

Solgaard et al., "Deformable grating optical modulator," Optics Letters, vol. 17, No. 9, May 1, 1992, pp. 688–690.

Ming C. Wu, "Micromachining for Optical and Optoelectronic Systems," Proceedings of the IEEE, vol. 85, No. 11, Nov. 1997, pp. 1833–1856.

* cited by examiner

MICROINTERFEROMETER FOR DISTANCE MEASUREMENTS

CROSS-REFERENCE TO RELATED APPLICATION

This application claims priority to the following co-pending U.S. provisional applications: a) "Micro-Interferometer for High Precision, High-Speed Flatness Measurement," having Ser. No. 60/356,960, filed Feb. 13, 2002 with U.S. Express Mail Label #EL-894720646-US; b) "Micro-Interferometers with Sensitivity Optimization and Self Calibration Capability," having Ser. No. 60/356,942, filed Feb. 13, 2002, with U.S. Express Mail Package No. EL-894720650-US; and c) "Micro-Interferometer for Accurate Absolute Distance Measurements," having Ser. No. 60/279,575, filed Mar. 29, 2001, which were al incorporated by reference herein their entirety.

This application is also related to the following co-pending U.S. utility patent applications: A) "System and Method for Surface Profiling," having Ser. No. 10/113,362, filed Mar. 29, 2002, with U.S. Express Mail Package No. EL-924223996-US; and b) "Microinterferometers with Performance Optimization," having Ser. No. 10/112,490, filed Mar. 29, 2002, with U.S. Express Mail Package No. EL-92223979-US, which are all incorporated by reference herein in their entirety.

FIELD OF THE INVENTION

The present invention generally relates to measurement devices. More specifically, the invention relates to interferometers for distance measurement.

DESCRIPTION OF THE RELATED ART

In general, optical interferometry is the act of splitting and recombining electromagnetic waves, in particular, visible light waves, to measure surface geometries, distance, etc. The advancement in interferometry has come in many avenues of technology. Long-range telescopes, high-precision spectrometers, compact disc players, etc., use some form of interferometry. Micro-machinery is a growing technology field that often utilizes interferometers because, they typically have high resolution and precision. In general, displacement measurements in the sub-nanometer range can be detected with today's interferometers. To examine microscale structures, the lateral resolution of the interferometers, generally, need to be improved. This can be achieved by coupling the interferometer to a regular microscope. Unfortunately, the size of the interferometer becomes rather large and subsequently may not fit in small spaces for inspection. Furthermore, to inspect a large number of microscale structures either the sample or microscope objective is scanned, resulting in slow imaging.

In order to obtain interferometric measurement sensitivity in a small volume, several methods have been developed. One of these methods involves phase sensitive diffraction gratings as described in a technical paper entitled "Interdigital cantilevers for atomic force microscopy," published in *Appl. Phys. Lett.,* 69, pp. 3944–6, Dec. 16, 1996 by S. R. Manalis, S. C. Minne, A. Atalar, and C. F Quate and also in U.S. Pat. No. 5,908,981 to Atalar et al.

Similar structures are also used in microaccelerometers to measure the displacement of a control mass with interferometric precision as described in a paper written by E. B. Cooper, E. R. Post, and S. Griffith and entitled "High-resolution micromachined interferometric accelerometer," Appl. Phys. Lett., 76 (22), pp. 3316–3318, May 29, 2000. It should be noted, however, that these papers discuss measuring relative distance of the object with respect to the reference gratings.

Two well known uses for microinterferometers are range finding and shape measurement, of which there are several optical range finding and shape measurement methods. Traditional range finding using focus analysis is an effective method, but for high accuracy and reduced depth of field, the lenses are typically large. Hence, mechanical scanning to make shape measurement becomes a slow and difficult task. Microscopes can be used to enhance the resolution, but this comes at the cost of extremely short standoff distances from the object, making scanning difficult. Interferometric ranging methods are very accurate, but in ordinary implementations, the methods operate in a relative coordinate space and can be problematic when the object surfaces have abrupt discontinuities.

It would be desirable to have a microinterferometer that can determine an absolute distance, as opposed to most of today's microinterferometers which can determine relative distance. It would also be desirable to increase the resolution and sensitivity of the microinterferometer, while keeping the microinterferometer relatively fast and relatively low in cost.

Based on the foregoing, it should be appreciated that there is a need for improved microinterferometers that address the aforementioned problems and/or other shortcomings of the prior art.

SUMMARY OF THE INVENTION

The present invention relates to microinterferometers. In this regard, a first embodiment of a microinterferometer for measuring the absolute distance to an object surface includes a substrate. The microinterferometer also includes a phase-sensitive, reflective diffraction grating formed on the substrate, the diffraction grating being configured to reflect a first portion of an incident light and transmit a second portion of the incident light, such that the second portion of the incident light is diffracted. The microinterferometer further includes a lens formed on the substrate for focusing the second portion of the incident light to a predetermined local distance, and a photo-detector for receiving interference patterns produced from the first portion of the incident light reflected from the diffraction grating and the second portion of the incident light reflected from the object surface.

A second embodiment of a microinterferometer in accordance with the present invention includes means for reflecting a first portion of an incident light and transmitting a second portion of the incident light, such that the second portion of the incident light is diffracted. The microinterferometer further includes means for focusing the second portion of the incident light on a predetermined local distance, and means for receiving interference patterns produced from the first portion of the incident light and the second portion of the incident light, wherein the second portion of the incident light has been reflected from an object surface.

A third embodiment of a microinterferometer in accordance with the present invention includes a substrate. The microinterferometer also includes at least a first diffracting micro-objective comprising the substrate, and a photo-detector for receiving interference patterns produced from a first portion of an incident light reflected from each diffracting micro-objective and a second portion of the incident light reflected from the object surface.

Embodiments of the invention may be construed as a diffracting micro-objective that includes a substrate. The diffracting micro-objective also includes a phase-sensitive, reflective diffraction grating formed on the substrate. The diffraction grating is configured to reflect a first portion of an incident light and transmit a second portion of the incident light, such that the second portion of the incident light is diffracted. The diffracting micro-objective also includes a lens formed on the substrate for focusing the second portion of the incident light to a predetermined local distance.

A representative method of fabricating a diffracting micro-objective is also provided. The method comprises the steps of: providing a substrate; forming a phase-sensitive, reflective diffraction grating on the substrate; and forming a microlens on the substrate.

A representative method for measuring the absolute distance to a target surface is also provided. The method comprises: illuminating the target surface with an incident light beam through a phase-sensitive, reflective diffraction grating, such that a first portion of the incident light beam is reflected and a second portion of the incident light beam is diffracted upon being transmitted through the diffraction grating; focusing the second portion of the incident light beam to a predetermined focal distance; receiving interference patterns produced from the first portion of he incident light beam reflected from the diffraction grating interfering with the second portion of the incident light beam reflected from the target surface; and measuring the intensity of the interference patterns to determine the absolute distance.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
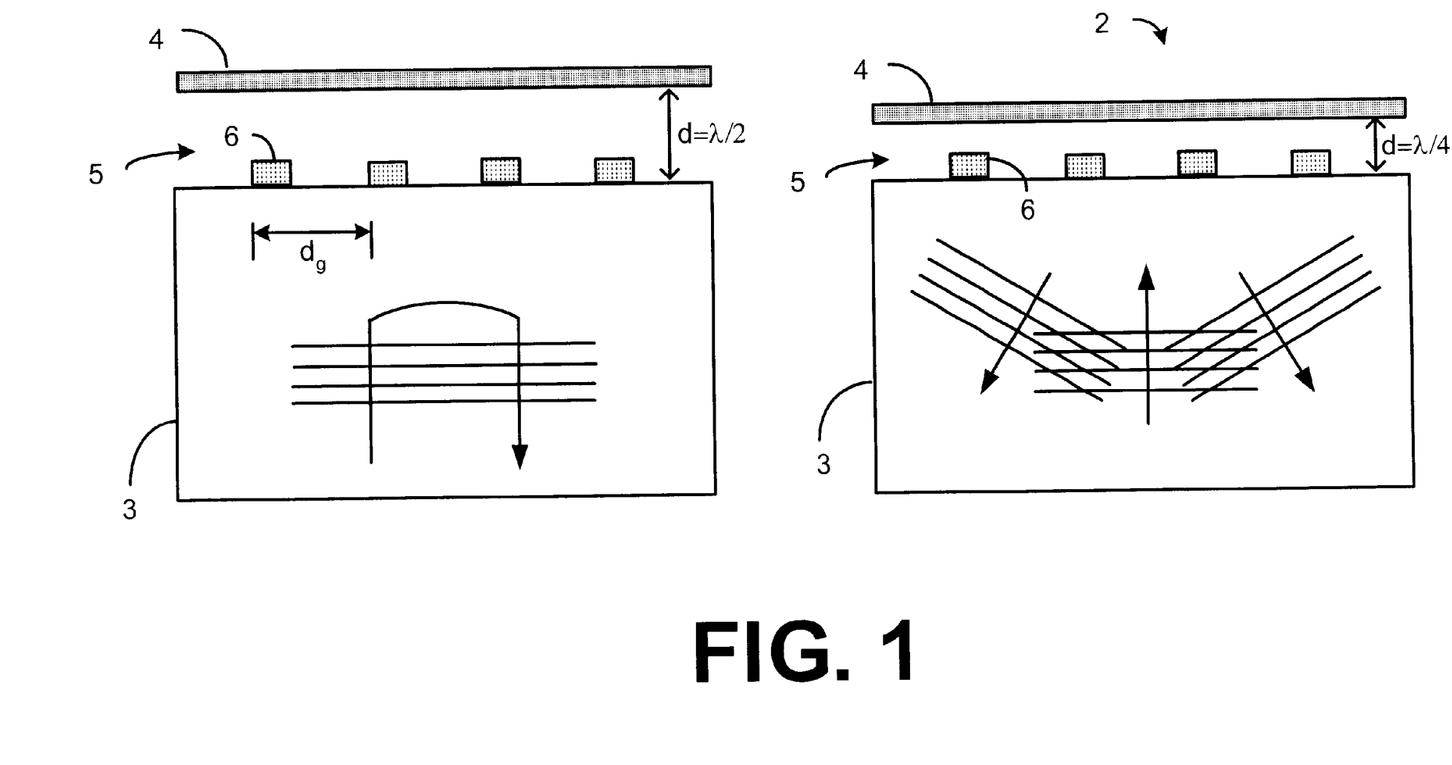
FIG. 1 is a diagram illustrating the concept of using a diffraction grating to split beams in a microinterferometer.

As will be described in greater detail herein, embodiments of a microinterferometer in accordance with the present invention can determine absolute distance. The microinterferometers disclosed herein also have improved resolution and sensitivity without sacrificing speed. Likewise, the microinterferometers can be easily adapted into an array structure for parallel processing. Referring now in more detail to the drawings, FIG. 1 is a diagram illustrating the concept of using a diffraction grating to split beams in a microinterferometer. This concept has been utilized in measuring precise relative displacements, such as for the measurement of Atomic Force Microscopy (AFM) tip displacement and in spatial light modulators, as in the grating light valves (GLV). This concept is also disclosed in co-pending U.S. patent application to F. L. Degertekin, G. G. Yaralioglv, and B. Khuri-Yakub, having Ser. No. 10/118,490, filed Jun. 28, 2001 with U.S. Express Mail Label No. ET-583617335-US and claiming priority to U.S. Provisional Patent Application Ser. No. 60/214,884. AFM, in general, is a technique for analyzing the surface of a rigid material at the atomic level. AFM uses a mechanical probe to magnify surface features up to 100,000,000 times, and it can produce 3-D images of the surface. In general, a GLV contains several tiny reflective ribbons that are mounted over a silicon chip with a tiny air gap in between the chip and the ribbons. When a voltage is applied to the chip below a particular ribbon, that ribbon bends toward the chip by a fraction of a wavelength of an illuminating light. The deformed ribbons collectively form a diffraction grating and the various orders of the light can be combined to form the pixel of an image. The shape of the ribbons, and therefore the image information, can be changed in as little as 20 billionths of a second.

The diagram of FIG. 1 illustrates two scenarios. A first scenario 1 shows what occurs when a target surface 4 is placed a distance of a half-wavelength, $\lambda/2$, away from a reference point, in this case, a reflective diffraction grating 5. A second scenario 2 shows what occurs when the target surface 4 is placed a distance of a quarter-wavelength, $\lambda/4$, away from the diffraction grating 5. The detailed diffraction pattern of such a structure can be found by applying standard diffraction theory to determine the locations and the dimensions of the photo-detectors or light guide apertures.

In both instances, the reflective diffraction grating 5 is formed on a transparent substrate 3. Exemplary materials that may be utilized to construct such elements will be discussed in further detail in relation to FIG. 4. The diffraction grating 5 is formed of an array of diffraction grating fingers 6 equally spaced along a front edge of the transparent substrate 3. It should be noted that, as mentioned above, this diagram is not to scale, and is merely for illustrative purposes. In reality, the diffraction grating fingers 6 would typically have a height on the order of micro- or nanometers.

In the first scenario 1, when an incident light is illuminated through the transparent substrate 3, a first portion of the incident light is reflected from the reflective diffraction grating 5. A second portion of the incident light is transmitted and diffracted about the diffraction grating fingers 6. The transmitted and diffracted light reflects off of the target surface 4 and is measured by a proper detection unit (not shown), such as a photo-detector or a photo-diode. As in scenario 1, the target surface is placed at a distance of $\lambda/2$ or any integer multiple, thereof. In this case, the $0^{th}$ order of the transmitted incident light is reflected back. In general, the $0^{th}$ order is the transmitted light that is illuminated directly, in which case no diffraction, or change in direction occurs. The first portion of the incident light, and the second portion of the incident light which has been reflected off of the target surface 4 interferes with each other. The phase of the two portions of the light waves help form constructive and destructive interference patterns. From the interference patterns, the relative distance between the diffraction grating 5 and the target surface 4 can be determined.

In scenario 2, the same general structure is set up. In this case, the target surface 4 is placed a distance of $\lambda/4$ away from the diffraction grating 5. In practice, the target surface 4 may be placed at any integer multiple of $\lambda/4$ and the same general results will occur. When the first portion of the incident light joins with the second portion of the incident light upon reflection, destructive interference cancels out the two. The second portion of the light travels an extra distance of 2× the distance between the target surface 4 and the diffraction grating 3, which results in a phase difference between the two portions of $\pi$, complete destructive interference. On the contrary though, the higher order diffraction fields, such as the first order, can constructively interfere with the first portion of the incident light. As FIG. 1 depicts, the higher order first and second portions of the incident light are angled and not parallel to the line of illumination, like the $0^{th}$ order beam.

Figure 2:
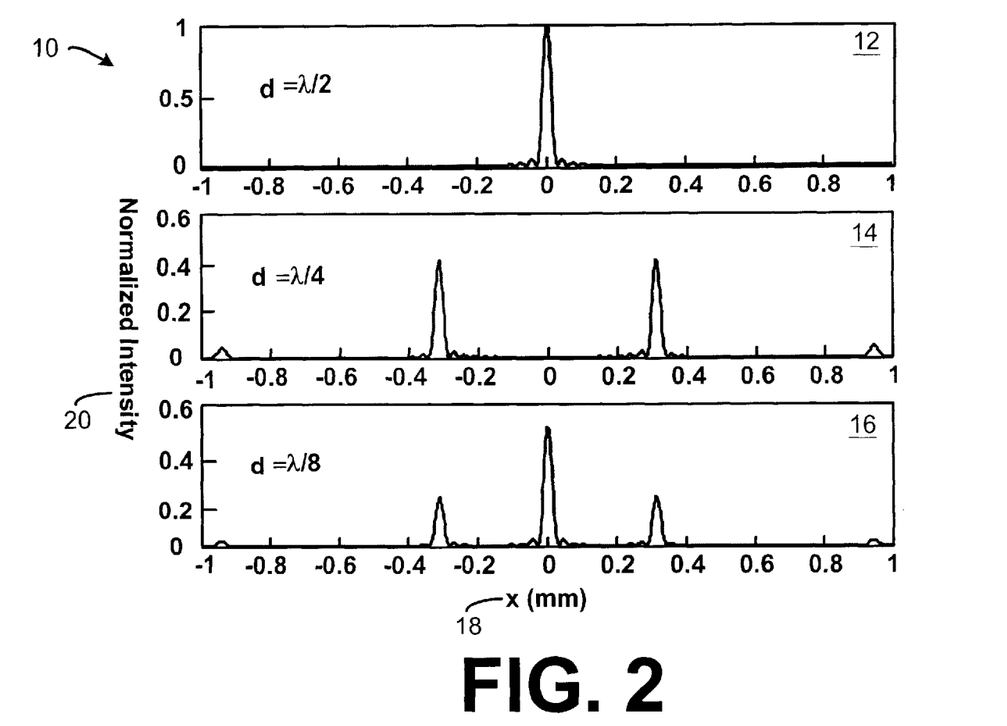
FIG. 2 is a graph illustrating the distribution of reflected light measured on an observation plane with various gap thicknesses utilizing the method illustrated in FIG. 1.

Having described an example of using a diffraction grating to split light beams and therefore measure relative distance, theoretical calculations will be utilized to display the results of using the method described in FIG. 1. Suppose an incident light of $\lambda$=632 nm is illuminated through the transparent substrate 3 onto the reflective diffraction grating 5. A laser can be utilized to provide the incident light. In this case, a helium-neon (HeNe) laser can be utilized. Suppose the diffraction grating 5 contains 10 diffraction grating fingers 6 equally spaced at $d_g$=2 $\mu$m. FIG. 2 is a graph 10 illustrating the distribution of reflected light measured on an observation plane with various gap thicknesses utilizing the method illustrated in FIG. 1. Hereinafter, the distance between a reference point, in this case the diffraction grating 5, and the target surface 4 will be referred to as the gap thickness and can be considered the absolute distance to the surface.

FIG. 2 shows the normalized intensity of reflected light 20 versus an observation length, x 18. The observation length, x, is in the lateral direction, and centered at the $0^{th}$ order beam. In this case, a 100 $\mu$m wide photo-detector has been used. Three scenarios are displayed in the graph 10. Scenario 12 shows the normalized intensity 20 with gap thickness, d=$\lambda$/2. Scenario 14 shows the normalized intensity 20 with gap thickness, d=$\lambda$/4. Scenario 16 shows the normalized intensity 20 with gap thickness, d=$\lambda$/8.

As expected, scenario 12 shows the $0^{th}$ order reflected beam with complete constructive interference. The higher order beams, e.g. the $1^{st}$ and $3^{rd}$ order beams incur destructive interference and so their intensity is cancelled out. Scenario 14 shows that the $0^{th}$ order has been completely cancelled out and the $1^{st}$ and the $3^{rd}$ orders of the reflected beam appear to have partial intensity. Scenario 16 shows that when the gap thickness, d=$\lambda$/8, both the $0^{th}$ order and the $1^{st}$ order contain some light intensity. Perhaps, most importantly, graph 10 attempts to show the periodic nature of the intensity of the orders of the reflected light versus varying gap thickness.

Figure 3:
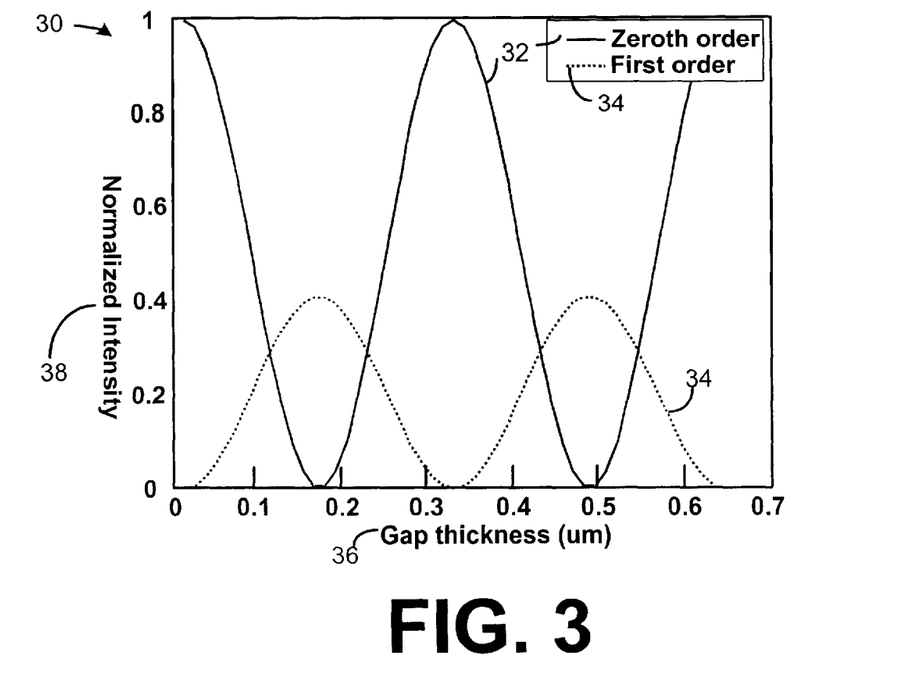
FIG. 3 is a graph illustrating the normalized intensity of various diffraction orders vs. gap thickness utilizing the method illustrated in FIG. 1.

The intensity of these orders as a function of grating-reflecting surface shows the $\cos^2(2\pi s/\lambda)$ and $\sin^2(2\lambda d/\lambda)$ variation, as illustrated in FIG. 3. FIG. 3 is a graph 30 illustrating the normalized intensity 38 of various diffraction orders 32 and 34 versus gap thickness 36 utilizing the method described in FIG. 1.

As shown in FIG. 3, the $0^{th}$ order curve 32 takes on a $\cos^2(2\lambda d/\lambda)$ shape. This is in line with the results found in FIG. 2. At gap thickness of $\lambda/2$, which is approximately 0.316 $\mu$m, the intensity is greatest. At gap thickness of $\lambda/4$, which is approximately 0.158 $\mu$m, the intensity is zero. The $1^{st}$ order curve 34 takes on a $\sin^2(2\pi d/\lambda)$ shape. The graph 30 of FIG. 3 clearly displays the periodic nature of the diffraction orders. As one can see, keeping all other variables constant and known, one can calculate the relative distance by measuring the intensity of the orders, in particular the $1^{st}$ order. In fact, by monitoring the intensity of any of the reflected orders, one can achieve interferometric resolution on the order of $10 \times 10^{-5}$ Å/√Hz.

Unfortunately, due to the periodic nature of intensity curves, absolute distance cannot be determined, only relative distance. For example, one cannot conclude whether the gap thickness is $\lambda/4$ or $3\lambda/4$. In the discussion that follows, several embodiments will be described that may solve this potential problem. To that, the presented solution also helps to improve the lateral resolution and overall sensitivity of the microinterferometer.

Figure 4:
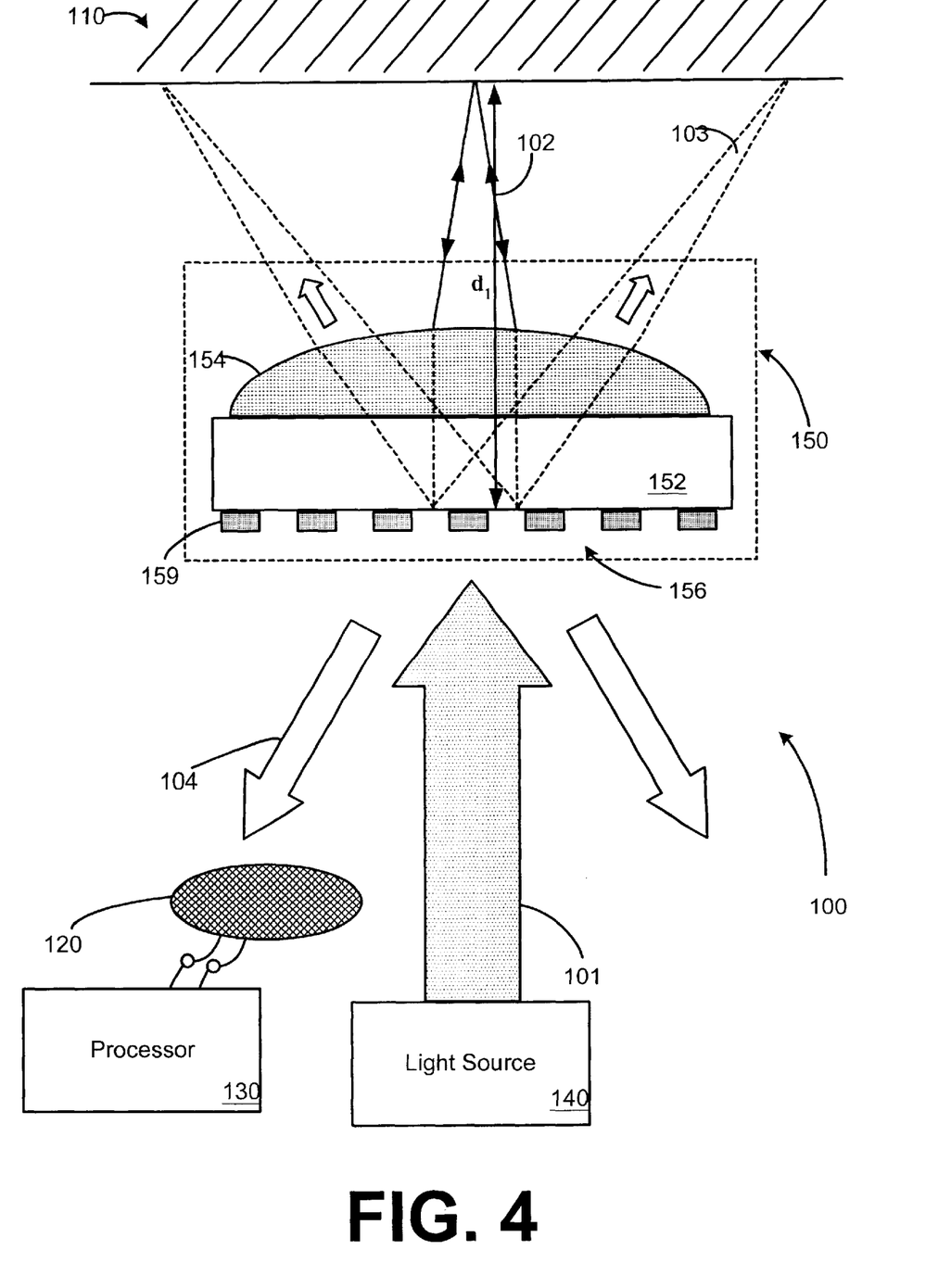
FIG. 4 is a diagram illustrating an embodiment of a microinterferometer in accordance with the present invention.

FIG. 4 is a diagram illustrating an embodiment of a microinterferometer 100 in accordance with the present invention. Included in the microinterferometer 100 is a light source 140 that provides the incident light. The microinterferometer 100 also includes a diffracting micro-objective 150. Included within the diffracting micro-objective 150 is a substantially transparent substrate 152, a phase-sensitive diffraction grating 156 formed onto the transparent substrate 152, and a lens 154 formed on the opposing side of the transparent substrate 152. A photo-detector 120 is also included in the microinterferometer 100 to receive the reflected light. Electrically coupled to the photo-detector 120 is a processor 130, which may be configured to process the received signals and therefore make appropriately desired calculations. In operation, a target surface 110 would be positioned at an unknown distance from a known reference point of the microinterferometer 100, and preferably normal to the direction of the incident light.

The light source 140, in this embodiment, may be a laser, that emits an electromagnetic wave at a known wavelength, $\lambda$. An emitted incident light beam 101 would be illuminated onto the reflective diffraction grating 156. In this embodiment, a Helium-Neon (HeNe) laser ($\lambda$=632 nm) may be utilized. In other embodiments, the light source 140 may be a laser emitting another known wavelength. The exact wavelength of the incident light beam 101 may vary as long as the dimensions of the components of the microinterferometer 100 are calculated in terms of the incident light beam 101 wavelength. To that, light sources emitting more than one known wavelength can be utilized as well, although, preferably, a light source emitting one known wavelength would be utilized. In practice, any kind of temporarily coherent light source with a coherence length equal to or greater than two times the distance between the target surface 110 and the diffraction grating 156 may be utilized.

In other embodiments, the incident light beam 101 may be carried via an optical fiber, in which case the light source 140 may be located remotely. As depicted in FIG. 4, the light source is positioned normal to the plane of the transparent substrate 152. Utilizing an optical fiber adds flexibility in placing the light source 140.

In yet other embodiments, the incident light beam 101 may be guided towards the diffraction grating 156 via a wave guide and/or a set of properly placed mirrors. For instance, the light source 140 may be placed relatively parallel to the lengthwise direction of the transparent substrate 152. In this case, a mirror and/or a wave guide can change the direction of the incident light beam 101 so that it is illuminated at a direction normal to the diffraction grating 156. To that, although it appears that the best results occur when the incident light beam 101 is illuminated at a direction normal to the diffraction grating 156, it need not be necessary.

The transparent substrate 152 is typically a planar surface, although not necessarily. For example, the substrate 152 may be cut so as to have a rounded surface for the forming the diffraction grating 156. This may aid in focusing the incident light beam 101. A variety of materials can be utilized for the substrate 152. Non-limiting examples are quartz, silicon, sapphire, glass, and combinations thereof. In other embodiments, the substrate 152 may be non-transparent, but a bulk-etched cavity may be incorporated into the substrate 152 to allow illumination. In general, the transmission coefficient, $\tau$, of the transparent substrate 152 for a given wavelength of incident light beam 101 may be larger than 0.9. The dimensions of the transparent substrate 152 can vary according to the overall structure of the microinterferometer 100, but in general, the lateral thickness of the substrate 152 may be in the range of 0.1 mm–2 mm, and likewise having a working distance of 0.1 mm–2 mm with an F-number from 1 to 5. The lateral length can vary with the structure of the microinterferometer 100. To ease in manufacturing, it may be necessary for the lateral length of the substrate 152 to be sufficiently longer than the width of the lens 154.

In other embodiments, the transparent substrate 152 may be configured, upon manufacture, to assist in focusing the diffracted and/or collimated incident light beams. In other embodiments, the lens 154 may be cut out of the substrate 152, so that the lens 154 would be fully integrated into the substrate 152.

The diffraction grating 156 may include several equally spaced fingers 159. In general, the spatial separation between adjacent fingers may be on the order of the wavelength of the incident light beam 1. The fingers 159 may be constructed of a reflective material that has a reflection coefficient of between 0.8 to 1. The dimensions of the fingers 159 can vary greatly with the wavelength of the incident light beam 101. In this embodiment, however, the dimensions of the fingers 159 may be on the order of the wavelength of the incident light beam 101, or about 0.5 $\mu$m to 10 $\mu$m. Collectively, the diffraction grating fingers 159 make up the diffraction grating 156. Several fingers 159 (on the order of 10 $\lambda$ in lateral length) may make up the diffraction grating 156. In this embodiment, the diffraction grating 156 is formed on the front planar surface of the transparent substrate 152. In other embodiments, the diffraction grating 156 may be formed on the rear planar surface of the transparent substrate 152. In this case, the lens 154 and the diffraction grating 156 may all be included on the same planar surface of the transparent substrate 152. The diffraction grating fingers 159 need not be equally spaced. The diffraction grating 156 may be configured to focus the incident light beam 101 on a given focal point. This may be accomplished by varying the spacing between the fingers 159 in such a way so as to focus the light. Likewise, in another embodiment to be discussed in FIG. 5, the diffraction grating fingers 159 are configured in such a way so as to guide the direction of the light.

The lens 154 may be of a different material than the substrate 152 and so would be formed on the rear planar surface of the substrate 152. In general, the lens may be a planar convex lens with a transmission coefficient of between 0.7 and 1. A non-limiting example of lenses 20 that can be utilized are a binary Fresnel lens or any lens with two or more phase steps. The lateral length of the lens 154 may be between 50 $\mu$m–500 $\lambda$m. The thickness of the lens 154 may be up to 50 $\mu$m, but generally, can greatly vary depending on how it is constructed. In other embodiments, as mentioned earlier, the substrate 152 may be formed in such a way that a separate lens 154 may not be necessary. The function of the lens 154 can be incorporated into the substrate 152.

The microinterferometer 100 also includes a photo-detector 120. In this embodiment, the photo-detector 120 may be placed parallel and in front of the substrate 152. As the figure depicts, the photo-detector 120 may be positioned to receive a higher diffraction order of the reflected light, such as the $1^{st}$ or $3^{rd}$ order. The observation length, x, can vary, but should be properly positioned so that a higher diffraction order may be observed. For example, the observation length x, may vary with the wavelength of the incident light beam 101. The photo-detector may be placed at an optimal longitudinal distance, e.g. 300 $\mu$m, but this may vary with wavelength.

In other embodiments, the photo-detector 120 may be remotely located and the diffracted light may be received via an appropriately placed optical fiber. In yet other embodiments, a wave guide and/or mirrors may change the direction of the diffracted and reflected beams. In this embodiment, as mentioned, the photo-detector 120 is placed parallel to the substrate 152. This allows for a relatively small space, on the order of 100 $\mu$m–1000 $\mu$m.

Several photo-detectors 120 are known in the art. In general, any photo-detector 120 that can be configured for micromachining and can sustain the desired bandwidth can be utilized. One specific example of a photo-detector that can be used is a silicon P-N junction photodiode. Another type that could be utilized is a P-I-N type photodiode. The utilized photo-detector 120 may depend on the processing speed and responsivity (photocurrent per Watt of incident light) requirements. For example, at wavelengths where the absorption of silicon is small, deeper junction depths may be required to increase responsivity.

Similarly, the geometry of the photo-detector 120 may be adjusted to minimize its capacitance and transit time to increase the detection bandwidth. Some signal conditioning circuitry, such as a transimpedance amplifier, may also be implemented on the same semiconductor substrate as the photo-detector 120 to minimize noise and decrease parasitic capacitance. These photo-detectors 120 with integrated electronics can be configured to operate with bandwidths from DC to GHz range for sensing optical communication applications.

A processor 130 may be included within the microinterferometer 100, but more than likely will be communicatively coupled to the microinterferometer 100 and be an external component. The processor 130 may be any type of electrical components that can process the signals received by the photo-detector 120. Likewise, hardware, software, and/or firmware may be utilized to properly make the appropriate calculations. For example, a personal computer may be configured to process the signals received from the photo-detector 120 in data that is compiled and calculated to produce the absolute distance. A relatively simple digital signal processor (DSP) or an application specific integrated circuit (ASIC) may be utilized to perform the calculations. The processor 130 may also be capable of making several other calculations and/or perform other functions, such as calibration, laser intensity normalization, digital filtering, and signal conditioning.

The microinterferometer 100 can measure the absolute distance, i.e. the gap thickness, to a target surface 110. Preferably, the reflectivity of the target surface 110 would be in the range of 0.5 to 1. It should be noted, however, that the reflectivity of the target surface 110 may be dependent on the wavelength of the incident light beam 101. In which case, the light source 140 may be selected so that a light beam 101 with a particular wavelength is emitted such that the reflectivity of the target surface 110 is highest. The addition of focal depth perception that comes in focusing the diffracted incident light beam 101, allows the microinterferometer 100 to measure absolute distance. To that, the focusing also increases the lateral resolution of the microinterferometer 100.

In operation, the incident light beam 101 is emitted from the light source 140. In this embodiment, the diffraction grating 156 is formed on the front planar surface of the transparent substrate 152. The reflective diffraction grating 156 reflects a first portion 104 of the incident light beam 101. A second portion 102 of the incident light beam 101 is diffracted upon transmission through the diffraction grating 156 and illuminated through the transparent substrate 152. Higher order diffracted light beams 103, such as the $5^{th}$ and $7^{th}$ order light beams are diffracted and will subsequently reflect off the target surface 110 and be lost.

The second portion 102 of the incident light beam 101 is focused to a particular focal distance, as determined by the lens 154. The depth perception gained with focusing helps determine the absolute distance by, generally, placing a bell-shaped distribution over the periodic $\cos^2(2\pi d/\lambda)$ and/or $\sin^2(2\pi d/\lambda)$ functions described in relation to FIG. 3. The main intensity lobe of the bell-shaped distribution may have a 3 dB width of about $\lambda/2$. This results in is a resolution of around 0.3 $\mu$m for a HeNe laser used as the light source 140. In reality, a bell-shaped curve would be a result of the focal depth gained from the lens 154 when the photo-detector 120 was placed a sufficient distance behind the diffraction grating 156. In practice, however, the photo-detector 120 would typically be placed much closer to the diffraction grating 156, e.g. 1 mm, so a true bell-shaped distribution may not be realized. The curve that would result, however, is still a known and determinable function of the absolute distance.

The second portion 102 of the incident light beam 101 is reflected off of the target surface 110 and returns in the direction of the microinterferometer 100. The photo-detector 120 is positioned to receive the first portion 104 and the reflected second portion 102 which have been combined to form an interference pattern due to the phase shift in the light waves caused by the difference in traveled distance. The processor 130 can then process and calculate absolute distance by counting the intensity cycles of the interference pattern. The intensity curve has a periodicity of $\lambda/2$, and so the distance from a reference depth can be found with an accuracy of $\lambda/2$. The reference depth can be decided from the intensity versus depth profile of the lens 154. For example, the point where the peak intensity is reduced by 10% can be taken as the reference depth.

The resolution can be further improved considering the slope of each intensity cycle, yielding distance measurements with sub-nanometer resolution. For absolute distance measurement resolution better than $\lambda/2$, the variation of the intensity within each interference cycle can be used. In this case, the information shown in FIG. 3 may be used to convert intensity variations to distance.

The microinterferometer 100 can therefore provide absolute distance measurements with high resolution. To that end, the bandwidth of the microinterferometer 100 is limited by the processing capabilities of the electrical components, hardware, software, etc., of the processor 130. Another advantage may be considered to be the extremely small size of the microinterferometer 100. Of most concern, generally, is the longitudinal dimension, which in this embodiment is approximately 500 $\mu$m, but may be anywhere in the range of 100 $\mu$m–1000 $\mu$m, from the front of the lens 154 to the photo-detector 120. It should be noted, that this is one example, and the longitudinal distance can vary greatly with the particular components utilized, the configuration utilized, and the general implementation. The lateral dimension can be relatively small as well. The longest element maybe the substrate 152, which may be only slightly longer than the diffraction grating 156 and/or lens 154, which can vary in range, but typically would be on the order of 10 $\lambda$–1000 $\lambda$. This allows for the possibility of mounting several microinterferometers 90 into an array or matrix structure.

Figure 5:
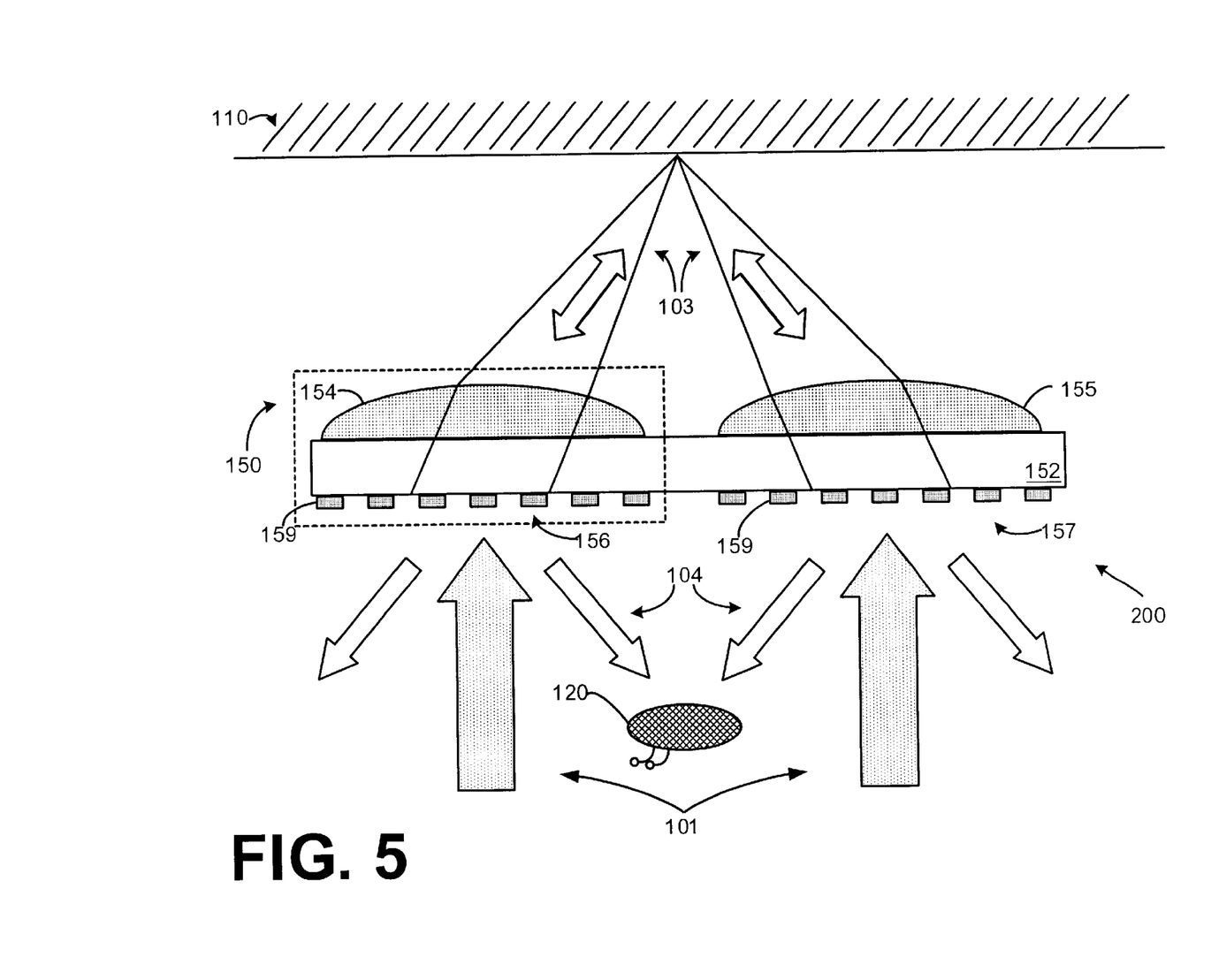
FIG. 5 is a diagram illustrating another embodiment of a microinterferometer in accordance with the present invention.

FIG. 5 is a diagram illustrating another embodiment of a microinterferometer 200 in accordance with the present invention. The microinterferometer 200 can provide for more sensitivity, and thus higher resolution, by using two incident beams 101 focused to a common focal point.

The microinterferometer 200 includes a single transparent substrate 152 similar to that of microinterferometer 200. Formed on the substrate 152 are two reflective diffraction gratings 156 and 145 similar to those of microinterferometer 200. The diffraction gratings 156 and 145 may be configured to guide higher order diffracted light beams 103 toward a particular direction. In this embodiment, the direction may be equal but opposite, that is toward a symmetry line running longitudinally along the microinterferometer 200. Two lenses 154 and 155 similar to those of microinterferometer 200 may be formed on the substrate 152 and provided to focus the higher order diffracted light beams 103 toward a common known focal point. Collectively, each lens 154 or 155 and diffraction grating 156 and 145 formed on the substrate 152 makes up a diffracting micro-objective 150. Two beams focused at a given focal point strengthens the intensity at that given point and provides a greater gradient of intensity for distances off from the focal distance. Interference patterns 104 can then be received by an appropriately placed photo-detector 120.

A light source (not shown) similar to those discussed in relation to FIG. 4 could be utilized to provide the incident light beams 101. A beam splitter, or other means for dividing the incident light beams 101 could be utilized. In some embodiments, two separate light sources could be utilized.

As mentioned, the substrate 152 may be similar to that discussed in FIG. 4. Generally, the substrate 152 would contain planar surfaces and would be substantially transparent so that the incident 101 and/or diffracted light beams 103 can be illuminated through without losing much (if any) intensity.

The reflective diffraction gratings 156 and 145 may be similar to the diffraction grating 156 of microinterferometer 200. Fingers 159 can be utilized to form the diffraction gratings 156 and 145. In this embodiment, the fingers 159 may be curvilinearlly shaped to guide the diffracted light beams 103.

The photo-detector 120 may be placed in such a way so as to receive the maximum intensity of the interference patterns 104. An advantage of this embodiment being that two beams are utilized so the intensity received by the photo-detector 120 is greater and so therefore, can greatly increase the signal-to-noise ratio (SNR) which can drastically improve the sensitivity and resolution of the microinterferometer 200.

In other embodiments, more than two incident light beams 101 can be illuminated and focused to a common focal point, using more than two diffraction gratings and lenses. In general, the more light received by the photo-detector 120 the greater the intensity, which can increase the SNR and thus improve the resolution. It should be noted, however, that this may lead to manufacturing issues as well as increase the complexity of the microinterferometer 200.

Figure 6:
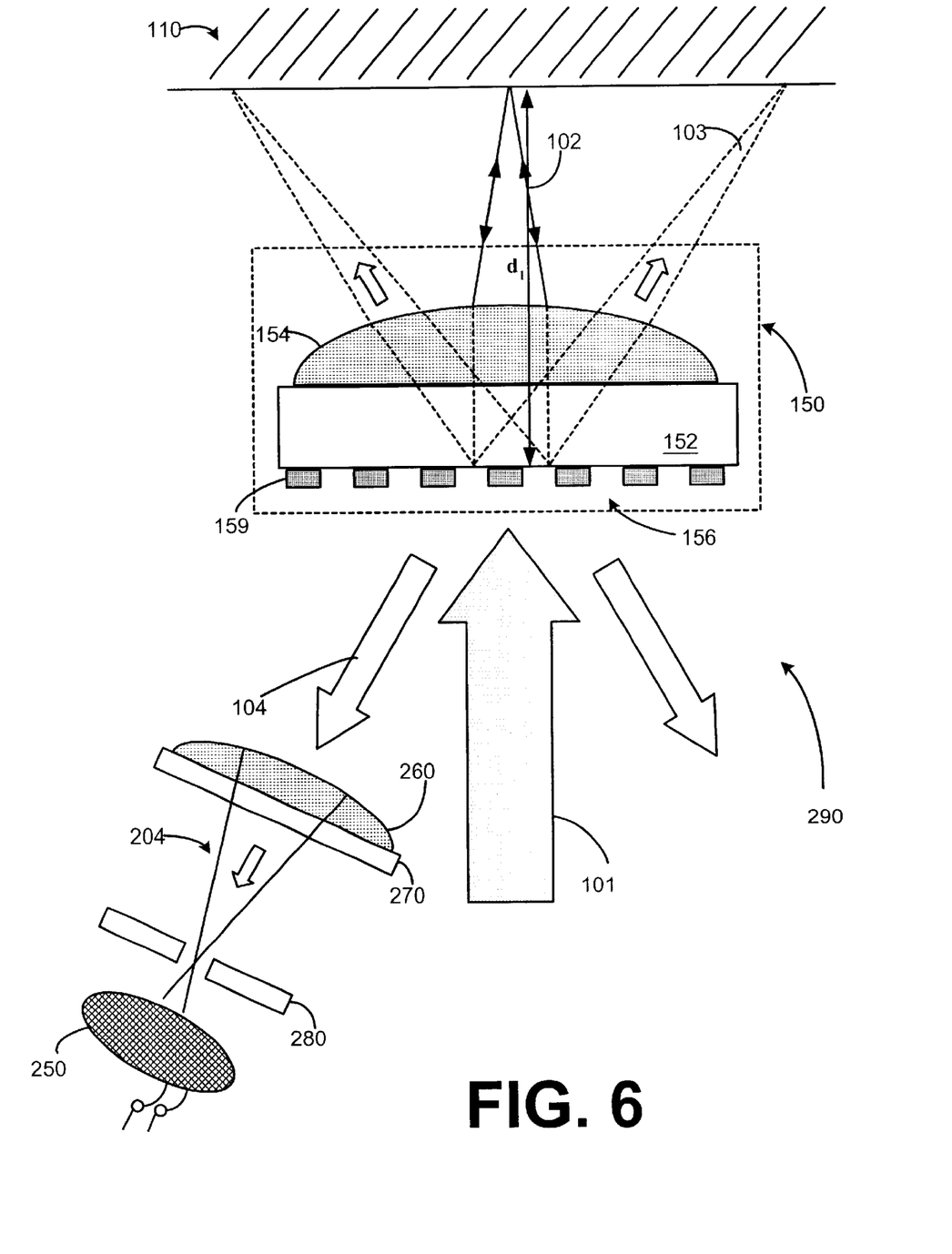
FIG. 6 is a diagram illustrating yet another embodiment of a microinterferometer in accordance with the present invention.

FIG. 6 is a diagram illustrating yet another embodiment of a microinterferometer 290 in accordance with the present invention. The microinterferometer 290 may improve upon the microinterferometer 100 in that the observation length, x, (See FIG. 4) can be reduced by adding a focusing element that focuses the interference patterns 104 prior to being received by a photo-detector 250. This microinterferometer 290 may also have improved SNR and thus higher resolution.

The microinterferometer 290 includes a diffraction grating 156 similar to those mentioned above. The diffraction grating 156 is formed on a planar transparent substrate 152 similar to those mentioned earlier. The diffraction grating 156 may be formed on a front planar surface of the substrate 152, as shown in FIG. 6 or may be formed on a rear planar surface of the substrate 152. In the second case, the diffraction grating 156 may be fully integrated with a lens 154 that is formed on the rear planar surface of the substrate 154. The lens 154 is similar to those discussed above as well as its general purpose of focusing the diffracted light beam 102 to a predetermined focal point.

The microinterferometer 290 also may include a second transparent substrate 270 that houses a second lens 260. An opaque substrate with a formed pinhole 280 may be placed behind the second substrate 270. Finally, the photo-detector 250 is positioned to receive a focused interference pattern 204.

The second lens 260 may be similar to the lens 154. Generally, the lens 260 may be a converging lens such as a convex lens. The second lens 260 may be formed on the substrate 270 in much the same manner as previously discussed. The lens 260 acts to focus the interference patterns to a particular focal distance. The opaque substrate with pinhole 280 may be placed a distance equal to the focal distance away from the substrate 270, which helps to eliminate noise. This may improve the SNR and, subsequently, may improve the resolution.

Utilizing the second lens 260 may be useful because it gives an added degree of freedom in the design of the microinterferometer 290. The photo-detector 250 of microinterferometer 290 was placed at an observation length, x, which, in the example given was approximately 300 μm. It was important to place the photo-detector 250 at this length because the first order diffraction beam appeared at the location. By focusing the interference pattern 104, the photo-detector 250 can be positioned closer to the first substrate 152. This can reduce the dimensions of the overall microinterferometer 290. In this embodiment, the second substrate 270, second lens 260, and photo-detector 250 are angled in such a way so as to receive the interference patterns 104 at a direct angle. In other embodiments, the second substrate 270, lens 260, opaque substrate 280, and photo-detector 250 may be placed substantially parallel to the first substrate 152. This may further reduce the dimensions of the microinterferometer 290.

Figure 7:
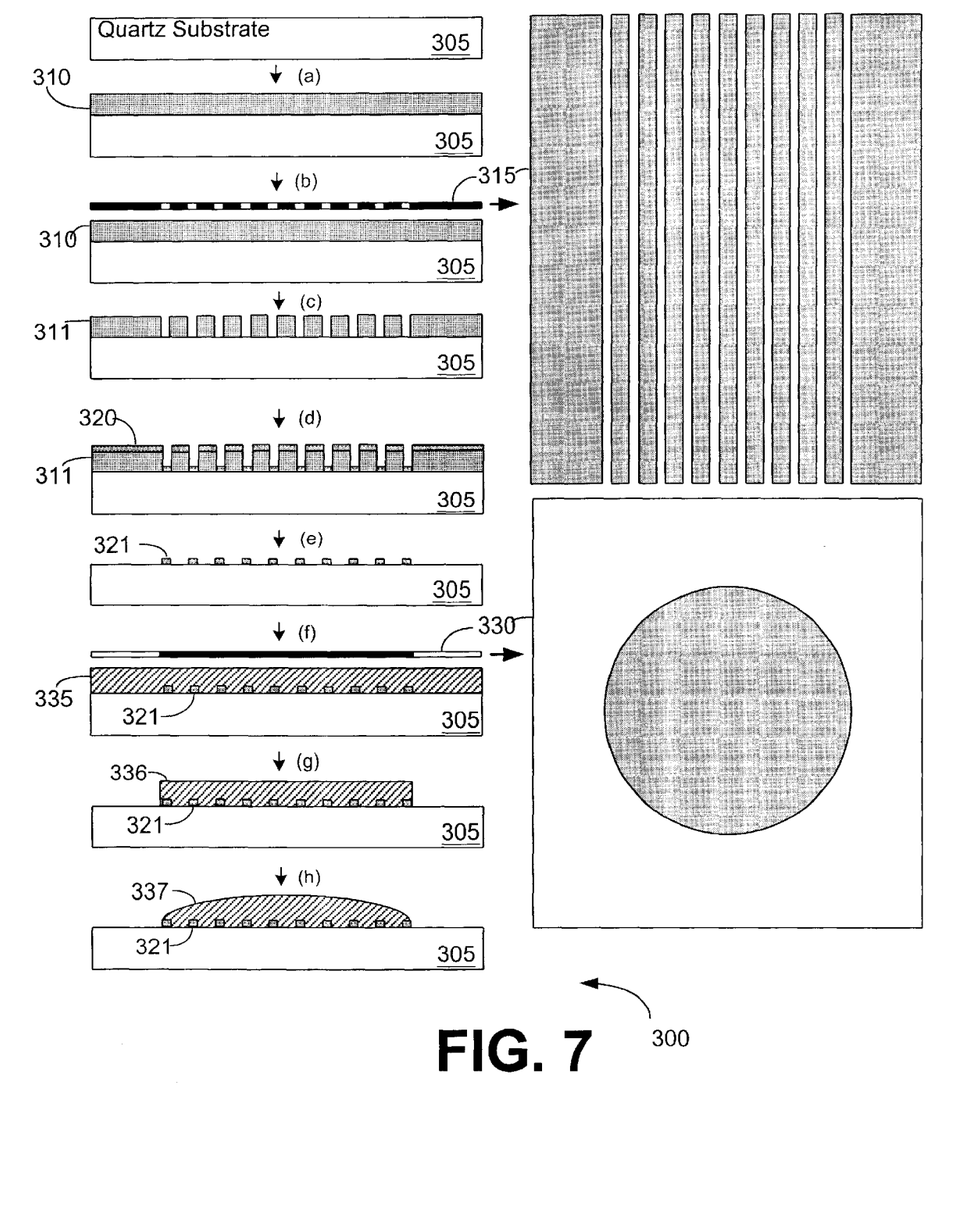
FIG. 7 is a diagram illustrating a method for fabricating a diffracting micro-objective in accordance with embodiments of the present invention.

Having thus described several embodiments of a microinterferometer, attention is now directed towards FIG. 7, which aims to describe a method 300 of fabricating a diffracting micro-objective 150 in accordance with the present invention. The general method 300 can be accomplished with several photolithography and/or micromachining techniques. The method 300 begins with a bare substrate 305. In this embodiment, the substrate is planar and FIG. 7 depicts the cross-sectional view of the substrate 305. The substrate 305, as mentioned above, is substantially transparent therefore allowing light to be illuminated through. In this embodiment, quartz may be utilized as the substrate 305. In other embodiments, materials such as sapphire and/or different types of glass, may be utilized. In yet other embodiments, non-transparent materials maybe utilized. An added step of bulk-etching a cavity to allow illumination through the substrate may be necessary, though.

The first step (a) in the method 300 is to deposit a photo resist (PR) layer 310 onto the top planar surface of the substrate 305. The PR layer 310 may be any commonly utilized positive or negative tone PR material, of which many are known in the art.

A diffraction grating fingers photo-mask 315 can be used to pattern the PR layer 310 using photolithographic techniques, most commonly involving ultraviolet radiation (step (b)). Depending on the deposition method used for the diffraction grating fingers 321, a bright-field or dark-field photo mask 315 can be used to pattern the PR layer 310 using photolithographic techniques, most commonly involving ultraviolet radiation. The photo mask 315, generally, will shape the diffraction grating fingers 321 for the diffraction grating of the diffracting micro-objective 150. In this embodiment, the fingers 321 may be equally spaced apart and similar in dimension. In other embodiments, the fingers 321 may be spaced and configured in such a way so as to guide light beams in a particular direction and/or to focus the light. In either of these cases, the photo mask 315 may be configured in such a way so as to allow particular spacing and/or dimension requirements for the fingers 321.

It should be noted, that several different photolithography techniques are known in the art, and ultraviolet radiation, is just one example of radiation that can be utilized. It is not the intent of this document to limit this invention to any particular type of radiation as well as any particular photolithography technique.

The method 300 proceeds with removing the exposed portion of the PR layer 310 (step (c)). A PR layer with channels 311 remains. The reflective diffraction fingers 321 can be deposited onto the substrate 305 and PR layer 310 using a lift-off technique or sputtering of a thin (0.1–2 μm) metal layer 320 such as aluminum, gold, silver, etc. (step (d)). To prevent undesired reflections between the backside of the grating and the target an optically absorbing layer (not shown) may be deposited between the reflective grating fingers 321 and the substrate 305 using the same photo-mask 315. In the preferred embodiment, the reflective material 320 is aluminum, although several other materials such as those mentioned above may be utilized.

Once the original PR layer 310 is removed (step (e)), all that remains are the reflective diffraction grating fingers 321 formed on the substrate 305. This generally completes the formation of the diffraction grating onto the substrate 305.

The next step is to form a microlens 337 on the substrate 305. The method 300 proceeds with step (f), where a second PR layer 335 is placed atop the substrate 305. In this embodiment, the PR layer 335, and subsequently the microlens 337 is placed atop the diffraction grating, and so would be on the same planar surface of the substrate 305. In other embodiments, the microlens 337 may be located on the opposite planar surface of the substrate 305 as the diffraction grating. Regardless, the same general procedure may occur. A second photo mask 330 configured for the microlens 337 is placed over the second PR layer 335. Ultraviolet radiation is again exposed onto the PR layer 335 via the second photo mask 330. Upon removing the exposed portion of the PR layer 335 (step (g)), a circular area 336 of the PR layer 335 remains on the substrate 305. In the final step, heat is judiciously applied to the circular area to form the microlens 337. In other embodiments, different fabrication techniques such as using binary lenses, or embossing techniques can be used to form the microlens 337 on the planar substrate 305.

Of importance to note may be the dimensions of the elements described. The diffracting micro-objective 150 may be utilized by a microinterferometer as described in the previous figures and/or in other embodiments. In general, regardless, the dimensions of the elements are quite small. For instance, the lateral dimensions of the substrate 305 may be in the range of 0.1 mm to 2 mm. The width of the fingers 321 may be on the order of the wavelength of the incident light beam.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A microinterferometer for measuring the absolute distance to an object surface, the microinterferometer comprising:
   a substrate;
   a phase-sensitive, reflective diffraction grating formed on said substrate, said diffraction grating being configured to reflect a first portion of an incident light and transmit a second portion of the incident light, such that the second portion of the incident light is diffracted;
   a lens formed on said substrate for focusing the second portion of the incident light to a predetermined focal distance; and
   a photo-detector for receiving interference patterns produced from the first portion of the incident light reflected from said diffraction grating and the second portion of the incident light reflected from the object surface.

2. The microinterferometer of claim 1, further comprising a processor for calculating, from the produced interference patterns, the absolute distance between the object surface and a reference point of said microinterferometer.

3. The microinterferometer of claim 1, wherein said lens is formed on the same plane of said substrate as said diffraction grating.

4. The microinterferometer of claim 1, wherein said lens is formed on the opposing plane of said substrate as said diffraction grating.

5. The microinterferometer of claim 1, wherein said photo-detector is positioned substantially parallel to said substrate.

6. The microinterferometer of claim 1, wherein said diffraction grating comprises a plurality of diffraction grating fingers positioned substantially linearly along a plane of said substrate.

7. The microinterferometer of claim 6, wherein said diffraction grating fingers are equally spaced.

8. The microinterferometer of claim 1, wherein said diffraction grating is further configured to steer the direction of the incident light.

9. The microinterferometer of claim 1, wherein said diffraction grating is further configured to focus the incident light to a predetermined focal point.

10. The microinterferometer of claim 1, wherein said substrate is configured to focus the second portion of the incident light.

11. The microinterferometer of claim 1, further comprising a source of the incident light.

12. The microinterferometer of claim 11, wherein said source is a laser.

13. The microinterferometer of claim 11, wherein the light is guided from said source via an optical fiber.

14. The microinterferometer of claim 1, wherein said photo-detector is between 50–500 $\mu$m wide.

15. The microinterferometer of claim 1, wherein said lens is between 50–500 $\mu$m wide.

16. The microinterferometer of claim 1, further comprising a second lens for focusing the reflected light prior to being received by said photo-detector.

17. The microinterferometer of claim 1, wherein said substrate is substantially transparent.

18. The microinterferometer of claim 17, wherein said substantially transparent substrate comprises quartz.

19. A microinterferometer comprising:
    means for reflecting a first portion of an incident light and transmitting a second portion of the incident light, such that the second portion of the incident light is diffracted;
    means for focusing the second portion of the incident light on a predetermined local distance; and
    means for receiving interference patterns produced from the first portion of the incident light and the second portion of the incident light, wherein the second portion of the incident light has been reflected from an object surface.

20. The microinterferometer of claim 19, further comprising means for calculating, from the produced interference patterns, the absolute distance between the object surface and a reference point of said microinterferometer.

21. The microinterferometer of claim 19, wherein said means for focusing is formed on a substrate.

22. The microinterferometer of claim 21, wherein said means for reflecting the first portion of the incident light and transmitting the second portion of the incident light is formed on the substrate.

23. The microinterferometer of claim 19, further comprising a substrate, wherein said substrate comprises means for focusing the second portion of the incident light.

24. The microinterferometer of claim 19, wherein said means for reflecting the first portion of the incident light and transmitting the second portion of the incident light comprises said means for focusing.

25. A microinterferometer for measuring the absolute distance to an object surface, the microinterferometer comprising:

a substrate;

at least a first diffracting micro-objective comprising said substrate; and a photo-detector for receiving interference patterns produced from a first portion of an incident light reflected from each diffracting micro-objective and a second portion of the incident light reflected from the object surface.

26. The microinterferometer of claim 25, further comprising a photo-detector for each diffracting micro-objective.

27. The microinterferometer of claim 25, further comprising a processor for determining, from the produced interference patterns, the absolute distance between the object surface and a reference point of said microinterferometer.

28. The microinterferometer of claim 25, wherein each of said diffracting micro-objective comprises:

a phase-sensitive, reflective diffraction grating formed on said substrate, said diffraction grating being configured to reflect the first portion of the incident light and transmit the second portion of the incident light, such that the second portion of the incident light is diffracted; and a lens formed on said substrate for focusing the second portion of the incident light to a predetermined local point.

29. The microinterferometer of claim 28, wherein said photo-detector is positioned substantially parallel to said substrate.

30. The microinterferometer of claim 28, wherein said diffraction grating comprises a plurality of diffraction grating fingers positioned substantially linearly along a plane of said substrate.

31. The microinterferometer of claim 28, wherein said diffraction grating is further configured to steer the direction of the second portion of the incident light.

32. A diffracting micro-objective comprising:

a substrate;

a phase-sensitive, reflective diffraction grating formed on said substrate, said diffraction grating being configured to reflect a first portion of an incident light and transmit a second portion of the incident light, such that the second portion of the incident light is diffracted; and a lens formed on said substrate for focusing the second portion of the incident light to a predetermined local distance.

33. The diffracting micro-objective of claim 32, wherein said lens is formed on the same plane of said substrate as said diffraction grating.

34. The diffracting micro-objective of claim 32, wherein said lens is formed on the opposing plane of said substrate as said diffraction grating.

35. The diffracting micro-objective of claim 32, wherein said diffraction grating comprises a plurality of diffraction grating fingers positioned substantially linearly along a plane of said substrate.

36. The diffracting micro-objective of claim 35, wherein said diffraction grating fingers are equally spaced.

37. The diffracting micro-objective of claim 32, wherein said diffraction grating is further configured to steer the direction of the second portion of the incident light.

38. The diffracting micro-objective of claim 32, wherein said diffraction grating is further configured to focus the second portion of the incident light to a predetermined focal point.

39. The diffracting micro-objective of claim 32, wherein said substrate is configured to focus the second portion of the incident light.

40. The diffracting micro-objective of claim 32, wherein said lens is between 50–500 $\mu$m wide.

41. A method for measuring the absolute distance to a target surface, the method comprising:

illuminating the target surface with an incident light beam through a phase-sensitive, reflective diffraction grating, such that a first portion of the incident light beam is reflected and a second portion of the incident light beam is diffracted upon being transmitted through the diffraction grating;

focusing the second portion of the incident light beam to a predetermined focal distance;

receiving interference patterns produced from the first portion of he incident light beam reflected from the diffraction grating interfering with the second portion of the incident light beam reflected from the target surface; and measuring the intensity of the interference patterns to determine the absolute distance.

* * * * *

UNITED STATES PATENT AND TRADEMARK OFFICE
CERTIFICATE OF CORRECTION

PATENT NO. : 6,643,025 B2
DATED : November 4, 2003
INVENTOR(S) : Degertekin et al.

It is certified that error appears in the above-identified patent and that said Letters Patent is hereby corrected as shown below:

<u>Column 5,</u>
Line 67, delete "$\cos^2(2\pi s/\lambda)$" and replace with -- $\cos^2(2\pi d/\lambda)$ --.

<u>Column 6,</u>
Line 17, delete "$10 \times 10^{-5} Å/\sqrt{Hz}$" and replace with -- $1 \times 10^{-5} Å/\sqrt{Hz}$. --.

<u>Column 8,</u>
Line 8, delete "$500\lambda m$" and replace with -- $500 \mu m$ --.

<u>Column 15,</u>
Line 26, delete "local" and replace with -- focal --.

<u>Column 16,</u>
Line 2, delete "local" and replace with -- focal --.
Line 37, delete "he" and replace with -- the --.

Signed and Sealed this

Third Day of February, 2004

JON W. DUDAS
*Acting Director of the United States Patent and Trademark Office*